US010693795B2

(12) United States Patent
Chen et al.

(10) Patent No.: US 10,693,795 B2
(45) Date of Patent: Jun. 23, 2020

(54) PROVIDING ACCESS TO APPLICATION PROGRAM INTERFACES AND INTERNET OF THING DEVICES

(71) Applicant: FUJITSU LIMITED, Kawasaki-shi, Kanagawa (JP)

(72) Inventors: Wei-Peng Chen, Fremont, CA (US); Mehdi Bahrami, San Jose, CA (US); Junhee Park, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/996,259

(22) Filed: Jun. 1, 2018

(65) Prior Publication Data

US 2019/0372900 A1 Dec. 5, 2019

(51) Int. Cl.
*H04L 12/851* (2013.01)
*H04L 12/859* (2013.01)
*H04L 12/24* (2006.01)
*H04L 12/927* (2013.01)
*H04L 29/08* (2006.01)

(52) U.S. Cl.
CPC ...... *H04L 47/2425* (2013.01); *H04L 41/5038* (2013.01); *H04L 47/2475* (2013.01); *H04L 47/805* (2013.01); *H04L 67/125* (2013.01)

(58) Field of Classification Search
CPC ............. H04L 47/2425; H04L 41/5038; H04L 47/2475; H04L 47/805
See application file for complete search history.

(56) References Cited

U.S. PATENT DOCUMENTS

| 2003/0167270 | A1* | 9/2003 | Werme | G06F 9/4856 |
| 2011/0238857 | A1* | 9/2011 | Certain | G06F 9/5044 |
|  |  |  |  | 709/232 |
| 2014/0108943 | A1* | 4/2014 | Lee | G09B 29/007 |
|  |  |  |  | 715/738 |
| 2015/0063166 | A1* | 3/2015 | Sif | G06F 9/45533 |
|  |  |  |  | 370/254 |
| 2015/0268936 | A1* | 9/2015 | Huber | G06F 8/34 |
|  |  |  |  | 717/108 |
| 2016/0065653 | A1* | 3/2016 | Chen | H04L 67/34 |
|  |  |  |  | 715/735 |

(Continued)

OTHER PUBLICATIONS

Amazon Device Shadow Service for AWS IoT, Retrieved on: Jun. 1, 2018, Retrieved From: https://docs.aws.amazon.com/iot/latest/developerguide/iot-device-shadows.html.

(Continued)

*Primary Examiner* — Jael M Ulysse
(74) *Attorney, Agent, or Firm* — Maschoff Brennan (57) ABSTRACT

A system for providing access to at least one of an application programming interface (API) and an Internet of Thing (IoT) device is provided. A system may include one or more processors configured to establish a connection between at least one user device and the at least one of the API and the IoT device. The one or more processors may further be configured to allocate resources for one or more services associated with the at least one of the API and the IoT device and provide the one or more services associated with the at least one of the API and the IoT device to the at least one user device. The one or more processors may also be configured to monitor at least one operational parameter associated with the one or more services provided to the at least one user device.

20 Claims, 5 Drawing Sheets

(56) References Cited

U.S. PATENT DOCUMENTS

| | | | |
|---|---|---|---|
| 2016/0105371 A1* | 4/2016 | Choi | H04L 47/70 370/230 |
| 2016/0105501 A1* | 4/2016 | Choi | H04W 4/70 709/225 |
| 2016/0182309 A1* | 6/2016 | Maturana | G06F 17/5009 709/224 |
| 2016/0285880 A1* | 9/2016 | Nakamura | H04L 63/101 |
| 2016/0328719 A1* | 11/2016 | Ananchaperumal | G06Q 30/0201 |
| 2017/0289176 A1* | 10/2017 | Chen | H04L 63/1408 |
| 2017/0331831 A1* | 11/2017 | Park | H04L 63/102 |
| 2017/0366616 A1* | 12/2017 | Rodrigues Nascimento | H04L 67/34 |
| 2017/0371937 A1* | 12/2017 | Shah | G06F 8/71 |
| 2018/0054490 A1* | 2/2018 | Wadhwa | H04L 63/06 |
| 2018/0213444 A1* | 7/2018 | Khawand | H04W 28/24 |
| 2018/0316799 A1* | 11/2018 | Shaw | H04L 41/20 |

OTHER PUBLICATIONS

RapidAPI | Marketplace, Retrieved on: Jun. 1, 2018, Retrieved From: https://rapidapi.com/.

Dimashirokov, Slack, Mar. 31, 2018, Retrieved From: https://rapidapi.com/dimashirokov/api/Slack/functions/addFileComment.

* cited by examiner

PROVIDING ACCESS TO APPLICATION PROGRAM INTERFACES AND INTERNET OF THING DEVICES

FIELD

The embodiments discussed herein relate to providing access to application programming interfaces (APIs) and/or Internet of Things (IoT) devices.

BACKGROUND

The Internet of Things (IoT) refers to the interconnection of computing devices (IoT devices). IoT devices may be uniquely identifiable and may communicate with one or more other IoT devices via one or more computing networks. An application programming interface (API) is a set of protocols, commands, definitions, and tools for creating application software. An API may specify how software components should interact and how APIs are used when programming graphical user interface (GUI) components or implementing services or functions.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system for providing access to at least one of an application programming interface (API) and an Internet of Thing (IoT) device may include one or more processors. The one or more processors may be configured to establish a connection between at least one user device and the at least one of the API and the IoT device. The one or more processors may also be configured to allocate resources for one or more services associated with the at least one of the API and the IoT device to the at least one user device. Moreover, the one or more processors may be configured to provide the one or more services associated with the at least one of the API and the IoT device to the at least one user device. In addition, the one or more processors may be configured to monitor at least one conditional parameter associated with the one or more services provided to the at least one user device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments discussed herein relate to enabling users to access, and in some embodiments, test API services and/or IoT devices (e.g., during software development via a service system). In some embodiments, a system may identify, generate, and/or process information (e.g. registration and authentication) that may be required to access services associated with the APIs and/or IoT devices. For example, the information may include an access token and/or at least one value of one or more mandatory parameters for accessing APIs and/or IoT devices.

In some embodiments, the system, which may be shared by a plurality of users, may be configured to monitor the usage of services from one or more users, allocate resources to the one or more users, dynamically adjust resources (e.g., allocate additional resources or reduce resources), and/or actively manage the communications to external API services or IoT devices (e.g., to ensure the quality and fairness).

Further, in various embodiments, a system may include an emulation module configured to enable users to determine a status of each IoT device (e.g., current temperature of home and the status/actions of an IoT-based thermostat), explore API results, API mashup possibilities, and/or enable for interaction between a physical device/service and a simulated virtual device (e.g., a user device such as a virtual machine or a container).

Open access services in both physical and cyber domains may be attractive to end users and/or developers because there are few constraints compared to closed ecosystems. Open access services may be equipped with REpresentational State Transfer (REST) APIs for easy access. Recently, the number of public open APIs and the number of internet-connected open access IoT devices has grown rapidly. Currently, there are more than 19,000 public APIs registered with ProgrammableWeb™. In addition, there exists numerous off-the-shelf IoT devices (e.g., that consumers can purchase from the retail market).

Due to numerous choices of APIs and IoT devices, it may be difficult for users (e.g. developers) to select appropriate APIs or IoT devices. For example, even after a developer identifies a specific candidate API or IoT device, the cost of time and money to spend in "trying" one API or IoT device is high. For instance, to test one API, a user may need to register with an API provider (e.g., if access authentication is required). Further, there may be a cost associated with the testing (e.g., even though a free trial may be available). Testing only one IoT device may less ideal. For example, a user may need to purchase an IoT device, and then test the IoT device. If the user does not like the IoT device, the user may return the IoT device or absorb the cost. Such problems slow down the proliferation of API Economy ecosystem and thwart the democracy of API economy.

On the other hand, several API and/or IoT device marketplaces, such as RapidAPI and API List, AT&T IoT Marketplace, and IOTLIST, exist. However, most marketplaces only provide a directory of API services or IoT devices with limited and static information. Testing and experiencing API or IoT services through a marketplace may be difficult or the marketplace might not include IoT device APIs.

In contrast to conventional systems and/or methods, various embodiments of the present disclosure may not rely on the 3$^{rd}$ parties (i.e. RapidAPI) to access an API service. Further, unlike conventional systems and/or methods, an expericen system, in accordance with various embodiments disclosed herein, may allow for users to interact with physical devices (e.g., IoT devices) (e.g., to test functionalities during a software development process).

Further, in contrast to a shadow service, which focuses on connecting to a specific type of device and storing the values of state information of a specific device owned by a user, various embodiments of the present disclosure provide access to various API/IoT devices, which are owned by a service system.

Moreover, unlike systems that, based on pre-defined knowledge, test interoperability between IoT devices and/or configurations of IoT devices, at least some embodiments of the present disclosure provide an "emulation" environment to interact with a physical device and/or witness actual responses of IoT devices.

Thus, in various embodiments, a system may enable users to experience services of APIs and/or IoT devices (e.g., through cloud services), and the cost of time and money to test a service (e.g., in a software development process) is much reduced compared with the conventional approaches. For at least these reasons, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Embodiments of the present disclosure will be explained with reference to the accompanying drawings.

Figure 1:
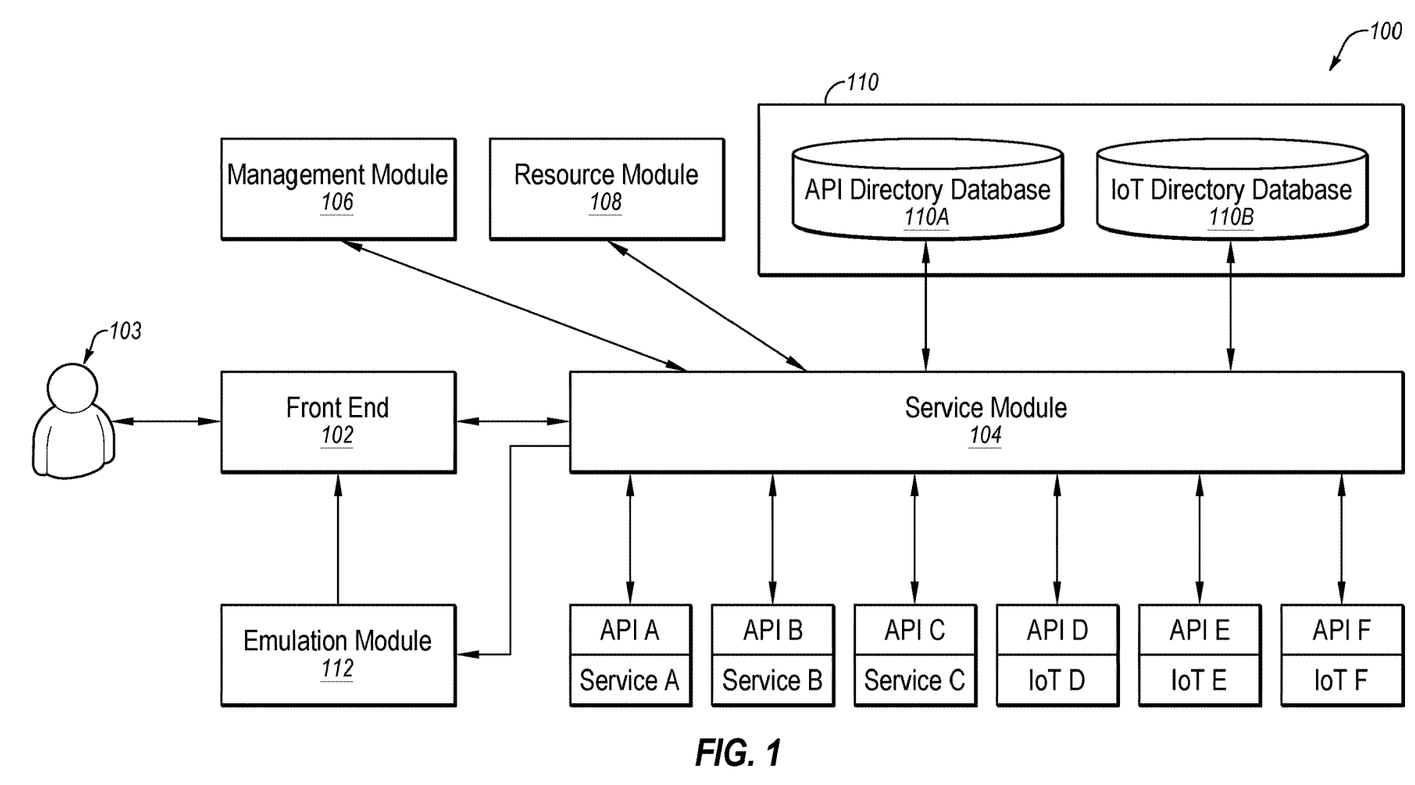
FIG. 1 illustrates an example system including a service system.

FIG. 1 illustrates an example system 100, in accordance with various embodiments of the present disclosure. System 100, which may also be referred to herein as a "service system" or an "experience system," includes front-end (e.g., a user front-end) module 102 (e.g., for user by a user 103) and service (back-end) module 104. As described more fully below, front-end module 102, which may also be referred to herein as a "user device," may include a virtual environment (e.g., a virtual device, a virtual IoT, a virtual API results, etc.) and/or a container. Further, service module 104 may also be referred to herein as an "experience module." System 100 further includes a management module 106, a resource module 108, and one or more databases 110. Databases 110 may include, for example only, an API directory database 110A and an IoT directory database 110B. In at least some embodiments, information of API calls to access services or IoT devices may be extracted in advance and stored in database 110. For example, the information may be extracted from API documentation and/or various crowdsources.

In various embodiments described more fully herein, management module 106 may be configured to manage user accounts and associated data and/or services, such as for example, user subscriptions, fees, billing, etc. Moreover, as described more fully herein, resource module 108 may be configured to monitor and adjust (e.g., dynamically adjust) usage of service module 104 (e.g., load balancing). Further, management module 106 and/or resource module 108 may be configured for active management to ensure quality of service (QoS) to one or more users and monitor traffic from the one or more users (e.g., for billing purposes).

Moreover, system 100 may also include an emulation module 112 and one or more services (e.g., services A-C) and/or devices (e.g., IoT devices D-F). In accordance with various embodiments, each of services A-C and IoT devices D-F may be accessible via an associated API (e.g., APIs A-F). More specifically, for example, service A may be accessible via API A. As another example, IoT device E may be accessible via API E. In at least some embodiments, APIs and/or IoT devices D-F may have HTML-based interfaces.

Figure 2:
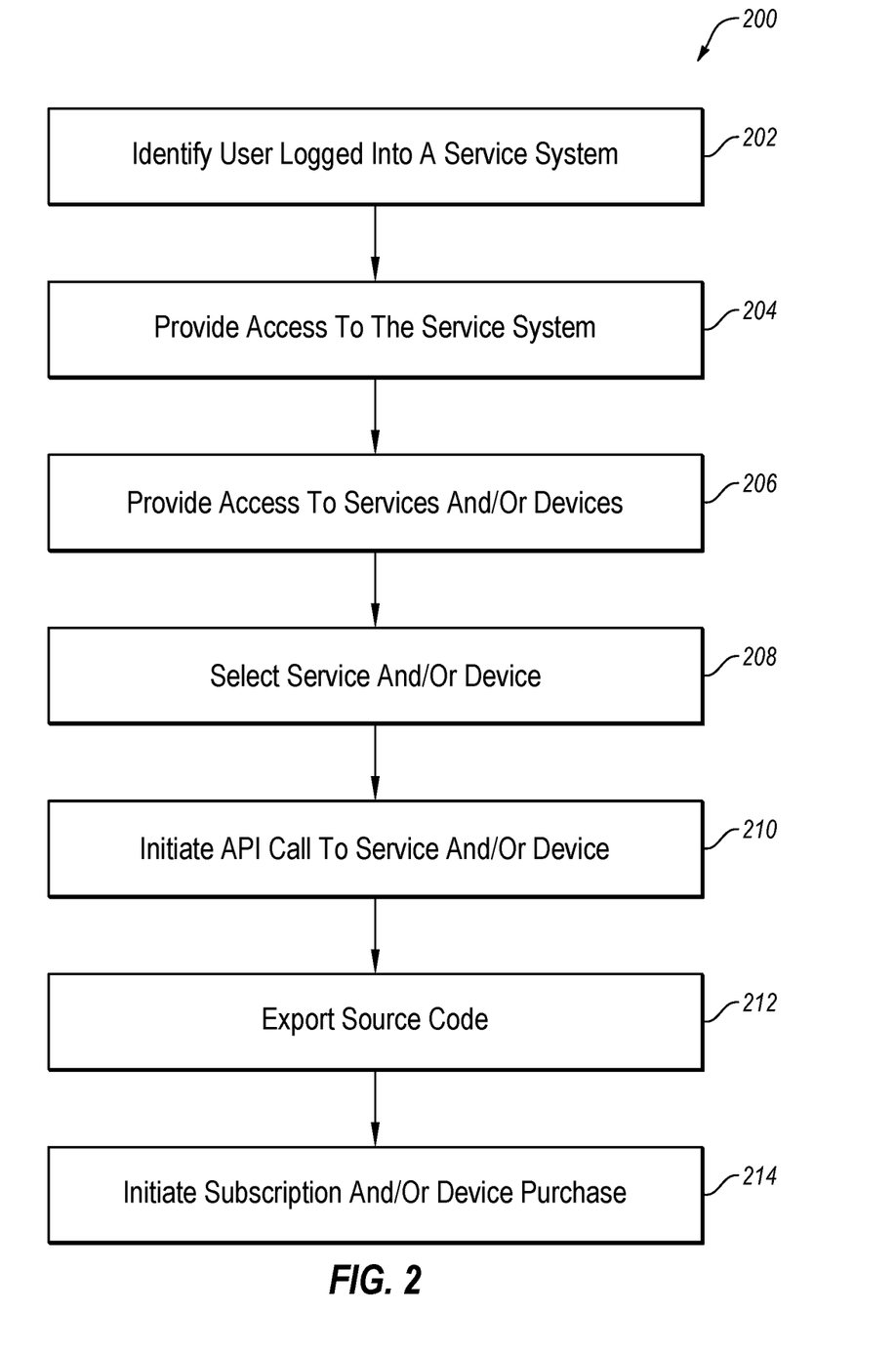
FIG. 2 depicts an example flow diagram of a method of utilizing a service system.

FIG. 2 illustrates a flowchart of an example method 200 of utilizing a service system, in accordance with one or more embodiments of the present disclosure. In some embodiments, one or more of the operations associated with method 200 may be performed by system 100 of FIG. 1. Alternately or additionally, method 200 may be performed by any suitable system, apparatus, or device. For example, processor 504 of system 500 (see FIG. 5) may perform one or more of the operations associated with method 200. Although illustrated with discrete blocks, the steps and operations associated with one or more of the blocks of method 200 may be divided into additional blocks, combined into fewer blocks, or eliminated, depending on the desired implementation.

At block 202, a user logged into to a service system may be identified, and method 200 may proceed to block 204. For example, a user (e.g., user 103 of FIG. 1) may login to service system 100 via front-end 102 (see FIG. 1). More specifically, user 103 may login and access service module 104 of FIG. 1. The user may be identified via any known user information.

At block 204, access to the service system may be provided to the user, and method 200 may proceed to block 206. More specifically, for example, after the user (e.g., user 103 of FIG. 1) logs into to the service system, to ensure a QoS provided to the user and possibly accounting purposes, a dedicated "front-end" (e.g., front-end 102 of FIG. 1) container or VM may be generated for the user to interact with the service system.

According to some embodiments, both a front-end (e.g., front-end module 102 of FIG. 1) (e.g., a VM and/or a container) and back-end systems (e.g., service module 104) may be within a controlled system. Further, in some embodiments, a management system (e.g., management module 106 of FIG. 1) may monitor messages between front-end 102 and APIs (e.g., APIs A-F; see FIG. 1) based on, for example, an IP address of front-end 102. In some embodiments, one or more functionalities of user management, quality of service (QoS), billing, and load balancing may be realized based on these messages.

At block 206, access to the services (e.g., API services and/or IoT devices) may be provided, and method 200 may proceed to block 208. For example, access may be provided to the user (e.g., user 103 of FIG. 1) via front-end module 102. Further, for example, a list of available services (e.g., APIs and/or IoT devices) may be provided to the user (e.g., to access). For example, in at least one embodiment, services and/or devices may be presented based on a simple query interface (e.g., to look up candidates of services and/or devices). In at least another embodiment, services and/or devices may be presented based on a directory including various categories of APIs and/or IoT device services.

At block 208, a service (e.g., an API) and/or an IoT device may be selected, and method 200 may proceed to block 210. For example, the user may select an API and/or an IoT device and receive information from service module 104.

For example, in some embodiments, once the user selects to "experience" a specific API and/or IoT device, service module 104 may retrieve source code the software module to access of the API or IoT device. Further, service module 104 may also provide information to the user (e.g., to test an API). Such information may include, for example, representative value of parameters of an API's endpoint call. Further, in some embodiments, the information may include the value of an authentication token, an access token, and/or an API key or user name and/or password (e.g., for the purpose of accessing the API/IoT service). Further, based on, for example, a tier of the user's subscription, different values of parameters, different accounts, or different access token may be provided to the user.

At block 210, an API call to a service and/or an IoT device may be made and a response may be received, and method 200 may proceed to block 212. For example, the user may make an API call with information provided by service module 104. Further, in some embodiments, the user may modify one or more values of one or more parameters in the API call. Upon a successful call, a response message may be returned to the user. In some embodiments, service module 104 may provide accessory supporting information, such as the description of the parameters in the response message. This information may be available via API documentation. In some embodiments, service module 104 may retrieve the description of the parameters from API documentation and store the information in database 110 (see FIG. 1), such API directory database 110A or IoT directory database 110B.

At block 212, source code of the API call may be exported, and method 200 may proceed to block 214. For example, in the event the user (e.g., user 103) is satisfied with the service and/or IoT device, source code of the API call may be exported (e.g., to user 103 of FIG. 1) for further integration with the user's own application.

At block 214, the user may subscribe to the selected service and/or purchase the IoT device. For example, service module 104 (see FIG. 1), serving as a wholesale market, may provide a competitive price to user 103.

Further, modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 3:
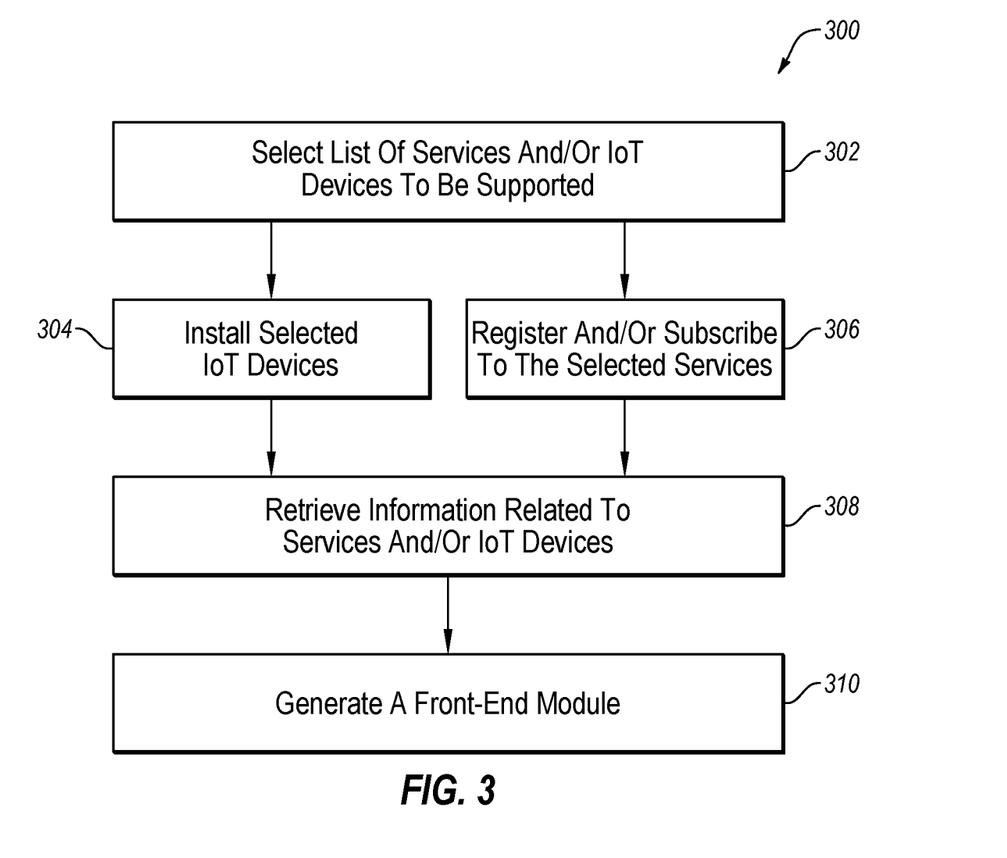
FIG. 3 depicts an example flow diagram of a method of generating a service system.

FIG. 3 illustrates a flowchart of an example method 300 of generating a service system, in accordance with one or more embodiments of the present disclosure. In some embodiments, one or more of the operations associated with method 300 may be performed by service system 100 of FIG. 1. Alternately or additionally, method 300 may be performed by any suitable system, apparatus, or device. For example, processor 504 of system 500 (see FIG. 5) may perform one or more of the operations associated with method 300. According to some embodiments, one or more of the operations associated with method 300 may be performed offline (e.g., offline processing). Although illustrated with discrete blocks, the steps and operations associated with one or more of the blocks of method 300 may be divided into additional blocks, combined into fewer blocks, or eliminated, depending on the desired implementation.

At block 302, a list of services (e.g., APIs) and/or IoT devices to be supported may be selected, and method 300 may proceed to block 304. Services and/or devices may be selected (e.g., by a system administrator) based on one or more factors. For example, selection may be based on popularity and/or on-demand requests from one or more users.

At block 304, IoT devices may be installed and coupled to the service system, and method 300 may proceed to block 306. For example, the IoT devices selected at block 302 may be installed and connected to service module 104 (see FIG. 1). Further, for example, the selected IoT devices may be powered on and installed within a controlled environment. According to various embodiments, an IoT device may be accessible via a cloud service (e.g., provided by the IoT device's vendor) and/or via a local gateway (e.g., a router) within a local area network (LAN). In some embodiments, configuration parameters, such as an IoT device's IP address may be recorded in an IoT device database (e.g., IoT directory database 110B of FIG. 1).

At block 306, services may be registered and/or subscribed to, and method 300 may proceed to block 308. For example, the API services and/or IoT devices selected at block 302 may be subscribed to and/or registered with service module 104 (see FIG. 1). For example, a system administrator of service system 100 may register the selected API services. In some embodiments, if subscription is required, a proper tier of usage may be selected based on the demand from the users. Further, for example, a program with web automation script may be used to assist or replace the system administrator's task. Moreover, in some embodiments, machine learning methods may be further applied to recognize one or more important input fields (e.g., the input form on the registration page) and create the automation script automatically.

At block 308, information related to services (e.g., APIs and/or IoT devices) may be retrieved, and method 300 may proceed to block 310. For example, the information may include API information, crowdsourcing information, registration information, etc. Further, for example, the retrieved information may be stored at a database (e.g., database 110A and/or databased 110B of FIG. 1). The information, which may include information for testing a function (e.g., an endpoint) of an API (e.g., a service or IoT device), may be generated and stored at the database. For example, the information may be created (e.g., by developers) via reading the API documentations. As another example, the information may be extracted automatically via machine learning methods of API learning.

In some embodiments, the value of parameters of calling one API endpoint may be created by a human. In other embodiments, the values may be extracted automatically from examples in the API documentations, open source projects, or forum discussion, etc. (e.g., crowdsourcing knowledge). In yet other embodiments, the values may be extracted automatically from an automation script. For example, the automation script may identify one or more fields on a registration web page, and fill in the registration information automatically to complete a registration process. Upon completion of the registration process, the automation script may retrieve, for example, an access token or an authentication token from a registration server.

At block 310, a front-end module may be generated. For example, the front-end module, which may include a front-end user interface may be generated such that the front-end module may be configured to interact with service module 104 of FIG. 1. For example, the front-end module may be configured such that the user interface is a query-based (e.g. keyword or short sentence search) and/or directory-based (e.g., based on categories).

Further, modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 4:
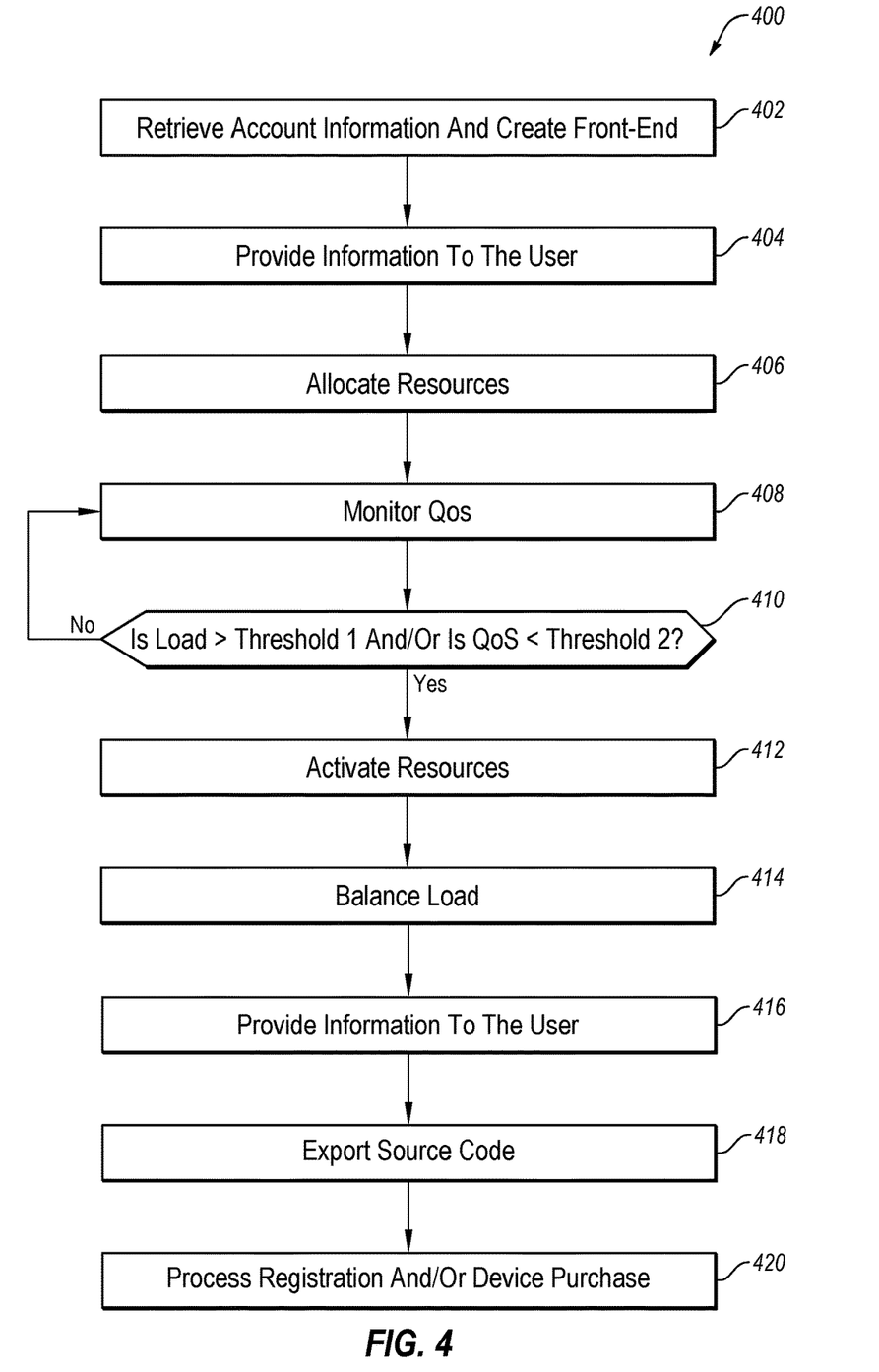
FIG. 4 depicts an example flow diagram of another method of generating a service system.

FIG. 4 illustrates a flowchart of an example method 400 of generating a service system, in accordance with one or more embodiments of the present disclosure. In some embodiments, one or more of the operations associated with method 400 may be performed by service system 100 of FIG. 1. Alternately or additionally, method 400 may be performed by any suitable system, apparatus, or device. For example, processor 504 of system 500 (see FIG. 5) may perform one or more of the operations associated with method 400. According to some embodiments, one or more of the operations associated with method 400 may be performed online (e.g., online processing). Although illustrated with discrete blocks, the steps and operations associated with one or more of the blocks of method 400 may be divided into additional blocks, combined into fewer blocks, or eliminated, depending on the desired implementation.

At block 402, account information for a user may be retrieved and a front-end may be generated, and method 400 may proceed to block 404. For example, account information for user 103 (see FIG. 1) may be retrieved and a front-end (e.g., front-end module 102) may be generated.

For example, upon a user logging onto service system 100 (see FIG. 1), a user device (e.g., a VM or container) may be created and dedicated to the user. In some embodiments, the user device (e.g., VM) may be used to, for example, provide enhanced QoS, to manage computing resource easily, to control the access within the controlled environment, and/or to monitor the access to external API services.

At block 404, information may be provided to the user, and method 400 may proceed to block 406. For example, upon the user selecting an API to test, information (e.g., information prepared in advance (e.g., information retrieved at block 308 of method 300)) may be retrieved from one or more databases (e.g., database 110A and/or database 110B) and presented to the user.

At block 406, resources may be allocated, and method 400 may proceed to block 408. For example, based on a subscription tier of the user, differentiated service may be provided to the user. More specifically, for example, a user who subscribes to a premier level of service may be provided with an exclusively dedicated account information. As another example, multiple users may share a single account for an API/IoT service. Further, for example, the usage of one particular user may be identified based on an IP address of, for example, a VM or container of front-end 102 (see FIG. 1). In some embodiments, the allocation may also be based on a current usage load.

At block 408, a QoS may be monitored, and method 400 may proceed to block 410. For example, the QoS for each active user may be continuously monitored via processor 510 of FIG. 5.

At block 410, a determination may be made as to 1) whether a current usage load is greater than a first threshold and 2) whether a QoS is less than a second threshold. If the current usage load is greater than a first threshold and/or the QoS is less than a second threshold, method 400 may proceed to block 412. For example, if the number of API calls from different users who share a single account exceeds a threshold (e.g., a number which indicates early warning to prevent future overuse of the account), method 400 may proceed to block 412. If the current usage load not greater than a first threshold or the QoS is not less than a second threshold, method 400 may return to block 408.

At block 412, additional resources may be activated, and method 400 may proceed to block 414. For example, the additional resources may be dynamically activated (e.g., via resource module 108 of FIG. 1). For example, a new account for an API service may be created and added to service system 100 (see FIG. 1). In an embodiment wherein an IoT device is accessed, the IoT device may, for example, be activated from a sleep mode, or a "power-on" command may be sent (e.g., to a smart switch) to power on the IoT device. If an accumulative demand of a service or device (e.g., API service or IoT device) exceeds a threshold, a new account may be added (e.g., via a system administrator or an automation script) and/or an order to purchase a new IoT device may be initiated (e.g., via a system administrator or an automation script).

At block 414, a load may be balanced, and method 400 may proceed to block 416. For example, a queuing system may be implemented within service module 104 (see FIG. 1) to track communications between service module 104 and IoT devices and/or APIs (e.g., external APIs). For example, one queue may be created for one IoT device or one account of API service. In some embodiments, differentiated queuing mechanisms may be applied to prioritize traffic from a preferred user. Further, in some embodiments, fairness among the users who share the same account may be monitored and/or controlled.

At block 416, information may be provided to the user, and method 400 may proceed to block 418. For example, upon receipt of an API response, the information may be provided to the user. For example, after a user makes an API call, if the call is executed successfully, a response message (e.g. in the format of JSON) may be returned to the user. Further, service module 104 (see FIG. 1) may capture the message and provide additional accessory supporting information, such as the description of a parameter (i.e. the "key" in the key-value pair within JSON file), to the user (e.g., to enable the user to better understand the meaning of the parameter). In some embodiments, such information may be prepared in advance and retrieved from a database (e.g., database 110A and/or database 110B). A source of the information may be API documentations. At block 417, the user may test the APIs/IoT devices via emulation module 112.

At block 418, source code may be exported, and method 400 may proceed to block 420. For example, if the user is satisfied with a service (e.g., with an API and/or an IoT device), the user may cause the source code of the API call to be exported. In some embodiments, the source codes may be integrated into the user's application. For example, for the case of an IoT device, if the user prefers to see the visual effects of the IoT device, such as the light or motion of an actuator device, the user may request to see the real-time video from a camera that points to the IoT device.

At block 420, registration and/or a purchase may be processed. For example, if the user prefers to subscribe to one or more API services and/or purchase one or more IoT devices, the user may order from service module 104, which may, for example serve as a wholesale market to provide competitive pricing. In addition, basic billing information may be available via service module 104. Further, billing information for a newly subscribed service and/or purchased device may be filled in automatically.

Further, modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

With reference again to FIG. 1, emulation module 112 may be configured to provide a current status of an API service and/or IoT device. For example, a user (e.g., user 103) may create a virtual smart home, and emulation module 112 may be configured to provide a current status of each API service or IoT device in the smart home. Further, for example, if the user turns off a light, the user may see the light turned off via emulation module 112.

Furthermore, emulation module 112 may allow a user to test the possibility of mashups between APIs, between IoT devices, and/or between an API and an IoT device without relying on a $3^{rd}$ party provider, such as an If This Then That (IFTTT) service.

Moreover, if an IoT device or an API service is not available or accessible via emulation module 112, and representative responses of API calls are known (e.g., from previous experiments or from other data sources, such as API documentation), a "simulated" API service and/or IoT device may be created, and a user may be allowed to interact between physical devices and/or services and/or virtual simulated devices and/or services.

Various use cases of various embodiments of the present disclosure will now be described. As one example, for an IoT/API marketplace (e.g., one stop IoT/API marketplace), service system 100 (see FIG. 1) may provide additional communication and storage functionalities. For example, if cellular service is needed, a communication service may be provided (e.g., mobile virtual network operation (MVNO) service part of IoT platform as a service (PaaS)). Moreover, for storage, service system 100 may provide virtual device services (e.g. for energy constrained devices).

As another example, service system 100 may be utilized as an API/IoT marketplace for businesses (e.g., small businesses) to post its services and for users to configure their needs. According to various embodiments, environment simulation may include both logical and visualize of IoT devices.

As disclosed herein, various embodiments relate to providing native API codes rather than embedded $3^{rd}$ party API calls like conventional systems. More specifically, users may directly access native APIs without relying on a $3^{rd}$ party to access the API. In addition, users may integrate codes generated (e.g., by system 100) into their application without modification (e.g., if the user uses an API subscription service provided by system 100).

Furthermore, various embodiments may enable physical and cyberspace to be bridged by providing users physical devices to access from cyberspace. Moreover, various embodiments may provide a wholesale market for API/IoT services (e.g., pool of services, similar to the concept of MVNO or Netflix).

Moreover, various embodiments may enable a user to apply any suitable rule and/or action to an IoT device and observe the status and/or monitor actions based on user's requests. Further, a user may be able to test mashups between APIs, between IoT devices, or between an API and IoT device (e.g., via emulation module 112 of FIG. 1) without relying on a $3^{rd}$ party provider, such as IFTTT (e.g., thus system privacy may be enhanced).

Figure 5:
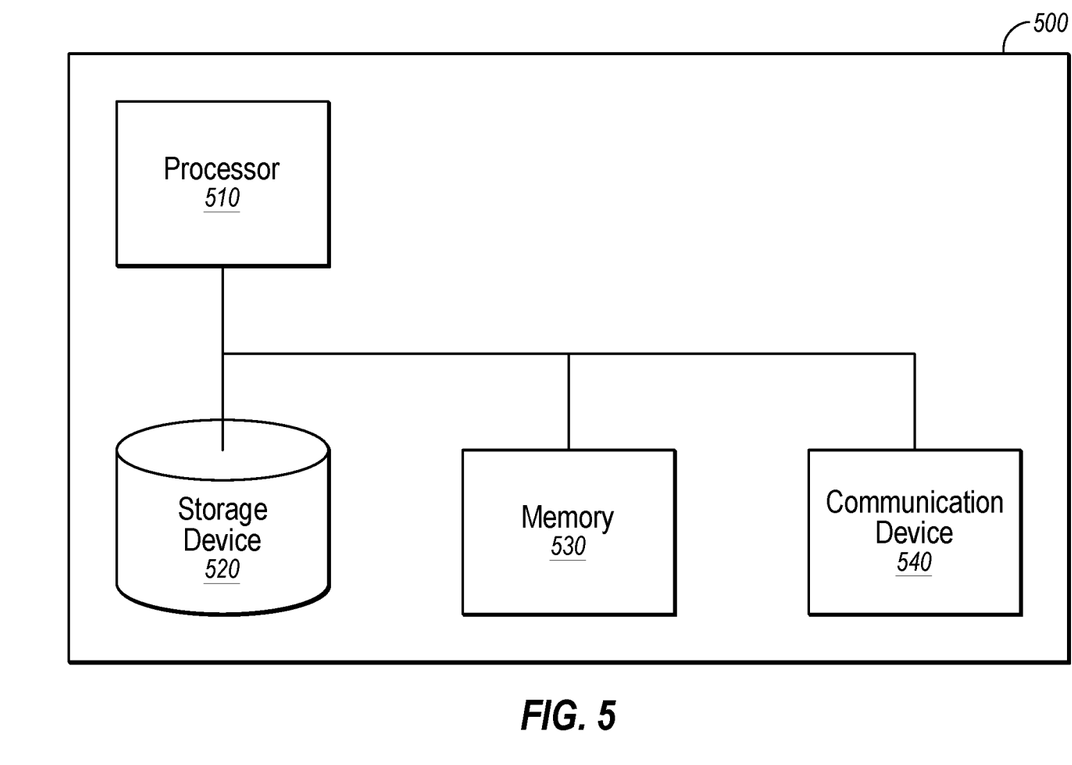
FIG. 5 is a block diagram of an example computing device.

FIG. 5 is a block diagram of an example computing device 500, in accordance with at least one embodiment of the present disclosure. Computing device 500 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 500 may include a processor 510, a storage device 520, a memory 530, and a communication device 540. Processor 510, storage device 520, memory 530, and/or communication device 540 may all be communicatively coupled such that each of the components may communicate with the other components. Computing device 500 may perform any of the operations described in the present disclosure.

In general, processor 510 may include any suitable special-purpose or general-purpose computer, computing entity, or processing device including various computer hardware or software modules and may be configured to execute instructions stored on any applicable computer-readable storage media. For example, processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, processor 510 may include any number of processors configured to perform, individually or collectively, any number of operations described in the present disclosure.

In some embodiments, processor 510 may interpret and/or execute program instructions and/or process data stored in storage device 520, memory 530, or storage device 520 and memory 530. In some embodiments, processor 510 may fetch program instructions from storage device 520 and load the program instructions in memory 530. After the program instructions are loaded into memory 530, processor 510 may execute the program instructions.

For example, in some embodiments one or more of processing operations for providing access to an API and/or an IoT device may be included in data storage 520 as program instructions. Processor 510 may fetch the program instructions of one or more of the processing operations and may load the program instructions of the processing operations in memory 530. After the program instructions of the processing operations are loaded into memory 530, processor 510 may execute the program instructions such that computing device 500 may implement the operations associated with the processing operations as directed by the program instructions.

Storage device 520 and memory 530 may include computer-readable storage media for carrying or having computer-executable instructions or data structures stored thereon. Such computer-readable storage media may include any available media that may be accessed by a general-purpose or special-purpose computer, such as processor 510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

In some embodiments, storage device 520 and/or memory 530 may store data associated with a service system and/or accessing APIs and/or IoT devices, and more specifically, data associated with APIs, IoT devices, subscriptions, resources, virtual machines, containers, QoS, loads, source code, etc.

Communication device 540 may include any device, system, component, or collection of components configured to allow or facilitate communication between computing device 500 and another electronic device. For example, communication device 540 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 540 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 5 without departing from the scope of the present disclosure. For example, computing device 500 may include more or fewer elements than those illustrated and described in the present disclosure. For example, computing device 500 may include an integrated display device such as a screen of a tablet or mobile phone or may include an external monitor, a projector, a television, or other suitable display device that may be separate from and communicatively coupled to computing device 500.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system for providing access to at least one of an application programming interface (API) and an Internet of Thing (IoT) device, comprising:
   one or more processors configured to:
      establish a connection between at least one user device and the at least one of the API and the IoT device;
      allocate resources for one or more services associated with the at least one of the API and the IoT device to the at least one user device;
      provide the one or more services associated with the at least one of the API and the IoT device to the at least one user device;
      monitor at least one parameter associated with the one or more services provided to the at least one user device;
      obtain a mashup between the at least one of the API and the IoT device and at least one of a second API and a second IoT device;
      obtain a virtual smart environment, the virtual smart environment including the at least one of the API and the IoT device, the at least one of the second API and the second IoT device, and the mashup;
emulate the virtual smart environment using the at least one of the API and the IoT device, the at least one of the second API and the second IoT device, and the mashup to test a possibility of the mashup to determine a compatibility of the mashup by determining an interaction between the at least one of the API and the IoT device and the at least one of the second API and the second IoT device; and
present a result of the test on the at least one user device.

2. The system of claim 1, wherein the at least one user device comprises one of a virtual machine and a container.

3. The system of claim 1, wherein the at least one parameter comprises a quality of service (QoS) of the system and a load on system, wherein the one or more processors are further configured to modify the allocated resources in response to at least one of the QoS of the system and the load of the system.

4. The system of claim 3, wherein the one or more processors are further configured to activate additional resources in response to at least one of the QoS of the system being below a first threshold and the load of the system being above a second threshold.

5. The system of claim 1, wherein the one or more processors are further configured to provide, to the user device, a status of an IoT device in communication with the user device.

6. The system of claim 1, wherein the one or more processors are configured to establish the connection between the user device and the one of the API and the IoT device based on a user selection of one of the API and the IoT device to test the one of the API and the IoT device for software development.

7. The system of claim 1, wherein the one or more processors are configured to allocate the resources for one or more services to the at least one user device based on a subscription level associated with the at least one user device.

8. A method of for providing access to at least one of an application programming interface (API) and an Internet of Thing (IoT) device, the method comprising:
establishing a connection between at least one user device and the at least one of the API and the IoT device;
allocating resources for one or more services associated with the at least one of the API and the IoT device to the at least one user device;
providing the one or more services associated with the at least one of the API and the IoT device to the at least one user device;
monitoring at least one operational parameter associated with the one or more services provided to the at least one user device;
obtaining a mashup between the at least one of the API and the IoT device and at least one of a second API and a second IoT device;
obtain a virtual smart environment, the virtual smart environment including the at least one of the API and the IoT device, the at least one of the second API and the second IoT device, and the mashup;
emulate the virtual smart environment using the at least one of the API and the IoT device, the at least one of the second API and the second IoT device, and the mashup to test a possibility of the mashup to determine a compatibility of the mashup by determining an interaction between the at least one of the API and the IoT device and the at least one of the second API and the second IoT device; and
presenting a result of the test on the at least one user device.

9. The method of claim 8, wherein the establishing the connection between at least one user device and the at least one of the API and the IoT device comprises establishing a connection between one of a virtual machine and a container and the at least one of the API and the IoT device.

10. The method of claim 8, wherein monitoring at least one operational parameter comprises monitoring at least one of a quality of service (QoS) associated with the providing the one or more services and a load associated with the providing the one or more services.

11. The method of claim 10, further comprising activating additional resources in response to at least one of the QoS associated with the providing the one or more services being below a first threshold and the load associated with the providing the one or more services being above a second threshold.

12. The method of claim 8, further comprising providing, to the user device, a status of an IoT device in communication with the user device.

13. The method of claim 8, wherein the establishing the connection between the at least one user device and the at least one of the API and the IoT device comprises establishing the connection between the user device and the one of the API and the IoT device based on a user selection of one of the API and the IoT device to test the one of the API and the IoT device for software development.

14. The method of claim 8, wherein the allocating resources for the one or more services to the at least one user device comprises allocating the resources for the one or more services based on a subscription level associated with the at least one user device.

15. One or more non-transitory computer-readable media that include instructions that, when executed by one or more processing systems, are configured to cause the processing system to perform operations, the operations comprising:
establishing a connection between at least one user device and at least one of an application programming interface (API) and an Internet of Thing (IoT) device;
allocating resources for one or more services associated with the at least one of the API and the IoT device to the at least one user device;
providing the one or more services associated with the at least one of the API and the IoT device to the at least one user device;
monitoring at least one operational parameter associated with the one or more services provided to the at least one user device;
obtaining a mashup between the at least one of the API and the IoT device and at least one of a second API and a second IoT device;
obtain a virtual smart environment, the virtual smart environment including the at least one of the API and the IoT device, the at least one of the second API and the second IoT device, and the mashup;
emulate the virtual smart environment using the at least one of the API and the IoT device, the at least one of the second API and the second IoT device, and the mashup to test a possibility of the mashup to determine a compatibility of the mashup by determining an interaction between the at least one of the API and the IoT device and the at least one of the second API and the second IoT device; and presenting a result of the test on the at least one user device.

16. The computer-readable media of claim 15, wherein the establishing the connection between at least one user device and the at least one of the API and the IoT device comprises establishing a connection between one of a virtual machine and a container and the at least one of the API and the IoT device.

17. The computer-readable media of claim 15, wherein monitoring at least one operational parameter comprises monitoring at least one of a quality of service (QoS) of the system and a load on the system.

18. The computer-readable media of claim 17, further comprising activating additional resources in response to at least one of the QoS of the system being below a first threshold and the load of the system being above a second threshold.

19. The computer-readable media of claim 15, wherein the establishing the connection between the at least one user device and the at least one of the API and the IoT device comprises establishing the connection between the user device and the one of the API and the IoT device based on a user selection of one of the API and the IoT device to test the one of the API and the IoT device for software development.

20. The computer-readable media of claim 15, wherein the allocating resources for the one or more services to the at least one user device comprises allocating the resources for the one or more services based on a subscription level associated with the at least one user device.

* * * * *